Nov. 1, 1927.　　　　　　　　　　　　　　　　　1,647,120
G. C. BALLOU
LUGGAGE CARRIER FOR AUTOMOBILES
Filed Sept. 29, 1925　　　3 Sheets-Sheet 1
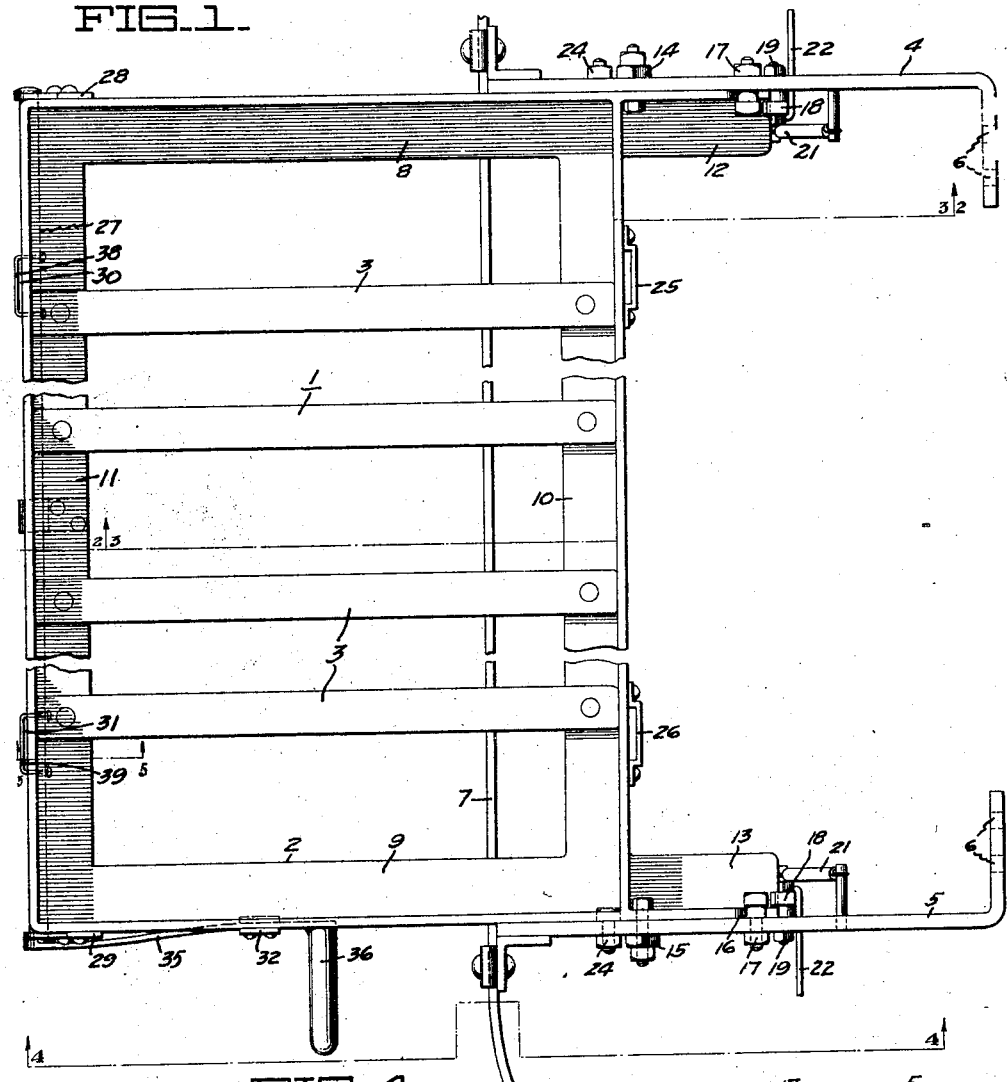
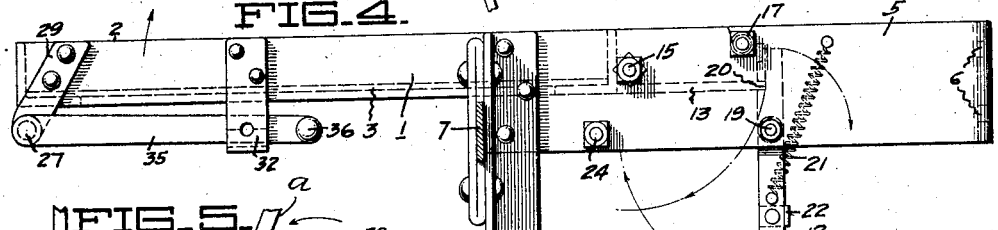
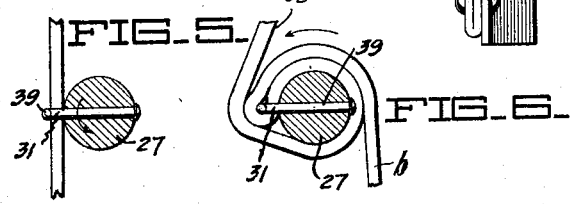
INVENTOR
George C. Ballou
BY
his ATTORNEYS Nov. 1, 1927.
G. C. BALLOU
LUGGAGE CARRIER FOR AUTOMOBILES
Filed Sept. 29, 1925   3 Sheets-Sheet 2
1,647,120
FIG_2_
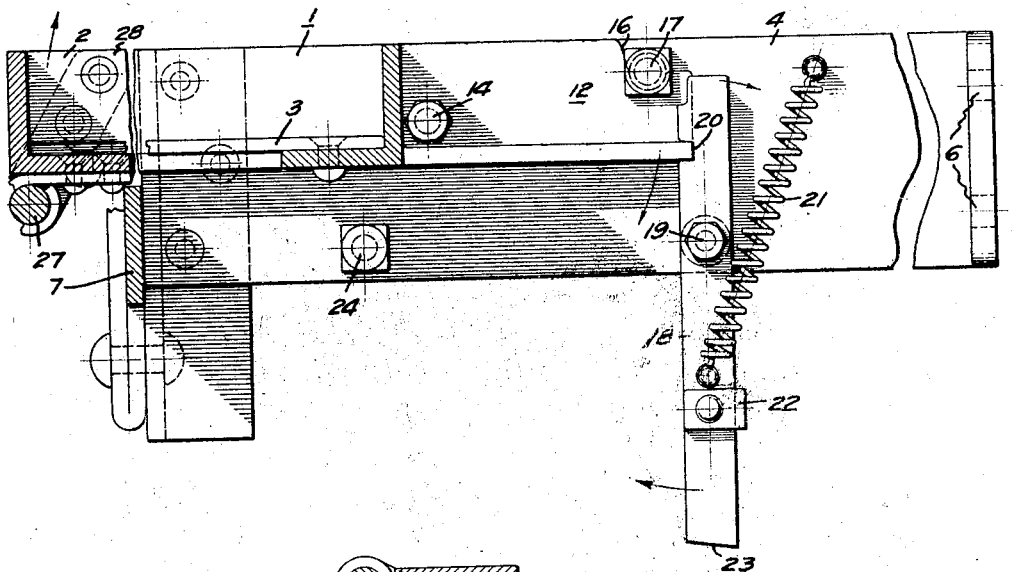
FIG_3_
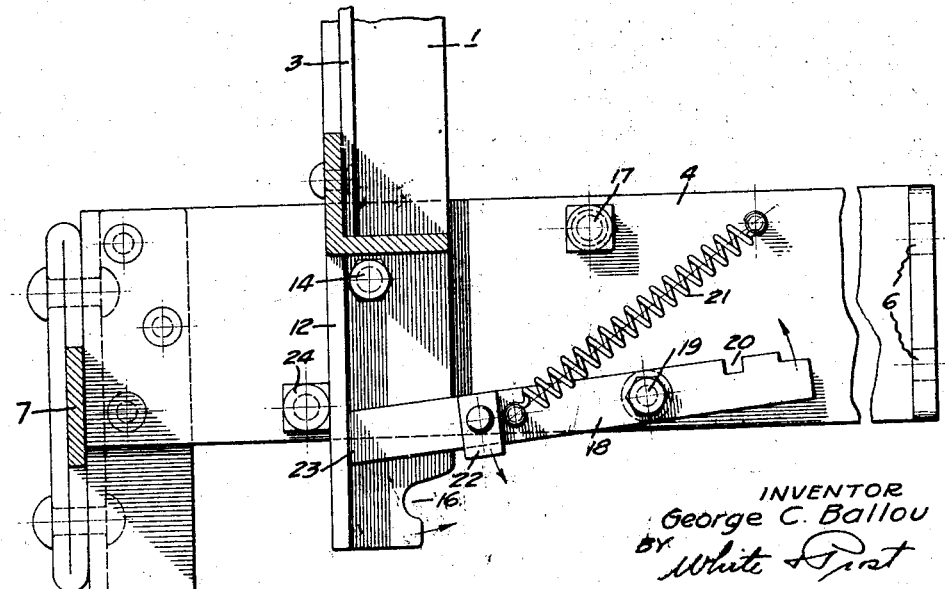
INVENTOR
George C. Ballou
BY
his ATTORNEYS Nov. 1, 1927.

G. C. BALLOU

LUGGAGE CARRIER FOR AUTOMOBILES

Filed Sept. 29, 1925

INVENTOR
George C. Ballou
BY White & Pint
his ATTORNEYS.

Patented Nov. 1, 1927.

1,647,120

UNITED STATES PATENT OFFICE.

GEORGE C. BALLOU, OF SAN JOSE, CALIFORNIA.

LUGGAGE CARRIER FOR AUTOMOBILES.

Application filed September 29, 1925. Serial No. 59,248.

This invention relates to a carrier or support for luggage and the like for automobiles and has for its object the provision of a simple, rugged and efficient device of this character.

More particularly, the invention relates to a carrier in the form of a horizontal holder or cradle on which the luggage is positioned and secured, the carrier being suitably secured to the automobile frame, preferably at the rear end of the automobile. In the present form of my invention the carrier is pivoted on a horizontal axis, and adapted to be moved to a vertical position when not in use. Novel means are provided for securing the luggage holder in either its horizontal or vertical position, which permit the ready adjustment of the holder to either position, and rigidly secures the same in either position, so as to prevent rattling of the parts and the movement of the carrier, a particular object being to prevent such movement or vibration, when the carrier is loaded with luggage, due to rough surfaces over which the automobile may be passing.

An object of the invention is to provide a luggage carrier of this character which may readily be placed in its operative or inoperative position.

Another object of the invention is to provide such a carrier which has no projecting parts or extensions when in its inoperative position, and which is positioned closely to the automobile on which mounted when not in use.

A further object of the invention is to provide a device of the character described in which the several parts are securely held and rattling prevented when the same is in either its operative or inoperative position.

A still further object of the invention is to provide a luggage carrier of this character having simple locking means for locking the luggage supporting member in either of its positions.

Another object of the invention is to provide novel means for tightening and securing the strap binding the luggage on the device.

The invention possesses other advantageous features, some of which, with the foregoing, will be set forth at length in the following description where I shall outline in full, that form of the invention which I have selected for illustration in the drawings accompanying and forming part of the present specification. In said drawings, I have shown one specific embodiment of my generic invention, but it is to be understood that I do not limit myself to such form, since the invention, as set forth in the claims, may be embodied in a plurality of forms.

Referring to the drawings:

Figure 1 is a plan view of a luggage carrier embodying my invention, shown in its carrying or operative position, with means for supporting the same on an automobile frame.

Figure 2 is an enlarged sectional view taken on the line 2—2 of Fig. 1, with parts broken away in order to reduce the size of the drawing, the several parts being shown with the carrier in its horizontal or carrying position.

Figure 3 is an enlarged sectional view taken on the line 3—3 of Fig. 1, illustrating the several parts with the carrier in its vertical or idle position.

Figure 4 is a section taken on the line 4—4 of Fig. 1.

Figure 5 is a section taken on the line 5—5 of Fig. 1.

Figure 6 is a view similar to Fig. 5 with a binding strap shown wound on the securing means.

Figure 7:
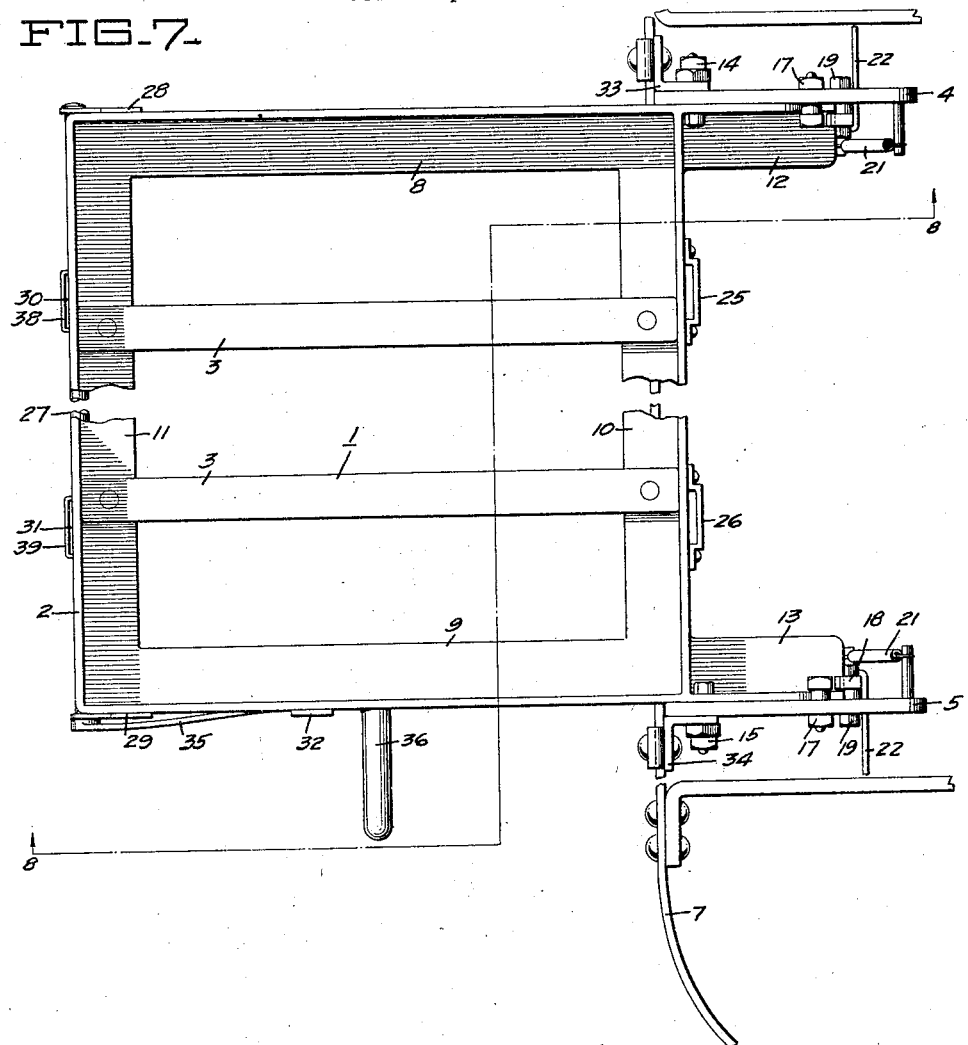
Figures 7 and 8 are views similar to Figs. 1 and 2, illustrating an embodiment of my invention mounted on the bumper.
Figure 8:
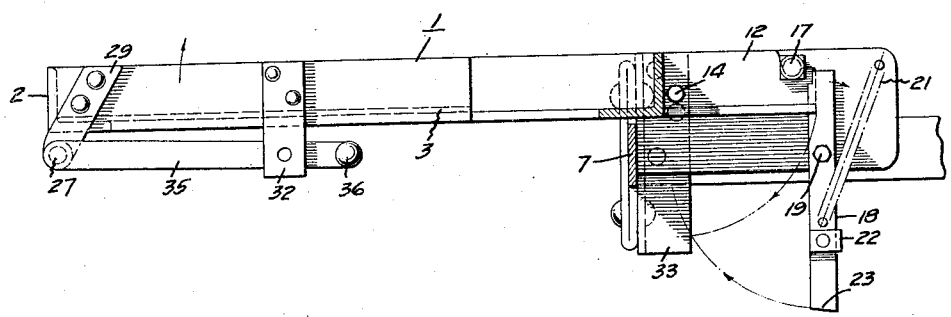

My invention comprises a carrying or holding member 1 for the luggage, which is preferably rectangular in shape with a flat bottom surrounded by a small upstanding edge better to hold the luggage thereon. I do not limit myself to any particular form of holding member since the design and shape of the same may be varied to fit the particular type of automobile for which it is made. In the present instance, the member 1 comprises a rectangular frame 2 the sides of which are L-shaped, and the longitudinal sides are connected by a series of flat cross pieces 3 as shown in Fig. 1. The frame 1 may be pivotally mounted on parallel supporting arms or brackets 4 and 5 which are specially provided for this purpose as shown in Fig. 1, and which are secured to the automobile frame which is not shown in the drawings, or it may be mounted directly on the bumper as shown in Figs. 7 and 8. In the former case, the arms 4 and 5 are positioned parallel with their inner ends bent in at right angles, said bent portions being provided with apertures 6 for receiving fastening bolts or the like. The arms 4 and 5 may consist of the usual arms provided for supporting the bumper as shown at 7 or they may be specially provided for supporting my carrier. Preferably, these arms are positioned on the rear of the machine. For convenience in describing the several parts, I shall refer to the portions of the frame 1 adjacent the arms 4 and 5 as sides 8 and 9 respectively and to the portions between the sides as the inner and outer ends 10 and 11 respectively. The sides 8 and 9 are provided with extensions 12 and 13 respectively adjacent the inner end 10 of the frame. Bolts 14 and 15 coaxially positioned on the arms 4 and 5 respectively, extend through the extensions 12 and 13 and thus pivotally support the frame 1 on the arms 4 and 5. The frame 1 has two positions, the horizontal position, shown in Fig. 1 being its carrying position, and a vertical or inactive position, to which it may be moved when not in use to avoid the projecting of the same from the rear of the automobile. In order to lock the frame securely in each of its positions, I have provided a simple locking mechanism for this purpose. A similar locking mechanism is provided on each of the arms 4 and 5, and a description of one will therefore suffice.

The locking mechanism will best be understood from the enlarged Figures 2 and 3, in which the same is shown with the holding member 1 in its horizontal position in Fig. 2 and in its vertical position in Fig. 3. The upper edge of the extension 12 adjacent its end is formed with a notch 16, adapted to engage a bolt 17 on the arm 4 when the carrier 1 is in its horizontal position. Thus when the carrier is moved about the pivot 14, the notch engages the bolt 17 and the further movement of the carrier in this direction is prevented. Unless means were provided for securing the carrier in this position, the carrier with its luggage would move up and down or about its pivot whenever the automobile passed over uneven surfaces. I have therefore provided means for locking the carrier in this position, which comprise a flat bar 18 pivoted at an intermediate point 19 on the arm 4. The bar 18 is provided with a notch 20 adapted to engage the lower edge of the L-shaped extension 12 as shown in Fig. 2, and thus rigidly secure the carrier in its horizontal position. The arm 18 is urged in its position by a spring 21 which is secured to the arm at a point below its pivot 19 and to one side thereof on the arm 4. For convenience in operating the arm 18, the same is provided with a handle 22, best shown in Fig. 1. When it is desired to move the carrier to its vertical or inoperative position, the arm 18 is rotated in a clockwise direction to release the extension 12, after which the carrier is moved to its vertical position. The lower end 23 of the arm is then moved to engage the extension 12 and hold the same against a projection or nut 24 as shown in Fig. 3. The spring 21 also acts to hold the arm 18 in this position in a manner readily understood. From the foregoing it will be seen that I have provided a simple mechanism for rigidly securing the carrier in either of its positions.

In order to secure the luggage on the carrier, the inner end 10 is provided with two flat eye pieces 25 and 26 to each of which a strap is secured. The outer end 11 of the carrier rotatably supports a rod 27, supports 28 and 29 secured to the sides 8 and 9 being provided for this purpose. The rod 27 is provided with pairs of openings 30 and 31 in positions corresponding to the positions of eye pieces 25 and 26, for receiving bent wires 38 and 39. These wires extend loosely through their respective openings and are formed with heads to prevent their dropping from the same. The free end of the strap extends from one of the eyes 25, 26 over the luggage to its corresponding wire 38, 39, and through the eye so formed as shown in Fig. 5, after which the rod 27 is rotated, thereby doubling the strap on itself and winding the same thereon as shown in Fig. 6. For rotating the rod 27 and locking the same in its wound position, one end of the same is provided with a flexible lever 35 having a handle 36. One side of the carrier, 1 shown as the side 9, is provided with an inwardly and upwardly extending hook member 32. Thus, after the strap is wound on the rod 27, the lever 35 is pushed inwardly and moved into engagement with the hook. Since the wound strap has a tendency to pull the lever down, it is securely held by the hook, and due to the spring action of the lever, it is urged tightly against the same, thus providing a simple and efficient means for tightening and securing the binding straps. By making the wires 38 and 39 slidable in the rod 27, they serve the double purpose of eyes as well as clamps, since when the rod is rotated, as shown in Fig. 6, the portion of the straps in the eyes formed by the wires is tightly clamped between the rod and the slidable wires 38 and 39. In Fig. 6 the loose end of the strap extends downwardly marked $a$ whereas the part of the strap under tension is indicated at $b$. Thus, the tighter the strap is wound on the rod 27, the greater the clamping of the strap by the wires 38 and 39 respectively.

If desired, instead of supporting the device on the automobile frame as shown in Fig. 1, it may be supported on the bumper 7, since the designs of automobiles vary more or less and such an arrangement is capable of wider use since the bumpers are all very similar. In this arrangement, the parts are arranged and operate in the same manner as heretofore described with the following exception. The supports 4 and 5 are shortened at their inner ends which are free, and the front ends of said supports are secured to the bumper 7 by means of angle pieces 33 and 34. In the present case the bolts 14 and 15 on which the carrier is pivoted are also utilized for securing the said angle pieces to the parts respectively. In the present case the stops 24 for securing the carrier 1 in a vertical position are omitted, since the carrier 1 is pivoted close enough to the bumper 7 so that it will bear against the rear surface of the same when in a vertical position.

I claim:

1. A luggage carrier for automobiles and the like, a frame for supporting the luggage, means fixed on the automobile pivotally supporting said frame for rotation about a horizontal axis, means limiting the movement of said frame from a vertical to a horizontal position, and means for locking said frame in either a vertical or a horizontal position, comprising an element pivoted on said supporting means for movement at right angles to said frame, said element being pivoted at an intermediate point and provided with a slot at its upper end for engaging said frame and locking it in a horizontal position, and an extension at its lower end adapted to engage and hold said frame in its vertical position.

2. A luggage carrier for automobiles and the like, a frame for supporting the luggage, means fixed on the automobile pivotally supporting said frame for rotation about a horizontal axis, means limiting the movement of said frame from a vertical to a horizontal position, and means for locking said frame in either a vertical or a horizontal position, comprising an element pivoted on said supporting means for movement at right angles to said frame, said element being pivoted at an intermediate point and provided with a slot at its upper end for engaging said frame and locking it in a horizontal position, and an extension at its lower end adapted to engage and hold said frame in its vertical position, and resilient means connected with said element and said supporting means adapted to urge said element into either of its engaging positions.

3. A luggage carrier for automobiles and the like comprising spaced supporting means fixed to the automobile, a frame pivotally supported on said means for rotation about a horizontal axis, said frame being pivoted at a point near its inner end, and provided with elements at its inner end extending beyond said axis of rotation, stops on said supporting means positioned in back of said axis adapted to engage said elements and stop the frame in a horizontal position, stops on said supporting means positioned in front of said axis and below the same adapted to engage said elements and stop the frame in a vertical position, and means for engaging said elements when they engage either of said stops and thereby rigidly secure the frame in either a horizontal or a vertical position, comprising a member for each of said elements pivoted on said supporting means for movement at right angles to said frame, said member being pivoted at an intermediate point and provided with a slot at its upper end for engaging said element and locking it against said first mentioned stops, and an extension at its lower end for holding said element against said latter mentioned stops.

4. A luggage carrier for automobiles and the like comprising a frame for supporting the luggage, arms fixed on the automobile, a pivotal connection between each of said arms and said frame, stops on said arms determining two extreme positions for said frame, a lever pivoted to one of said arms, and a spring for urging said lever to contact said frame in both of said extreme positions.

In testimony whereof, I have hereunto set my hand.

GEORGE C. BALLOU.